United States Patent [19]

Sonntag

[11] Patent Number: 4,542,617
[45] Date of Patent: Sep. 24, 1985

[54] BALING MACHINE

[76] Inventor: Patrick Sonntag, Box 97, Goodsoil, Saskatchewan, Canada, S0M 1A0

[21] Appl. No.: 619,923

[22] Filed: Jun. 12, 1984

[51] Int. Cl.⁴ ............................................. A01D 39/00
[52] U.S. Cl. ......................................... 56/341; 100/88
[58] Field of Search ...................... 56/341; 100/88, 89, 100/76

[56] References Cited

U.S. PATENT DOCUMENTS 4,035,999  7/1977  Crane et al. ............................ 56/341
4,135,352  1/1979  Swenson et al. ....................... 56/341

Primary Examiner—Jay N. Eskovitz
Attorney, Agent, or Firm—Stanley G. Ade

[57] ABSTRACT

In a baler of the type comprising a housing which can open in clamshell formation to release a formed bale from the rear of the housing and including a plurality of separate belt runs which are permanently arranged around the periphery of the housing, a mechanism is provided for temporarily holding the infed material while a bale is discharged and while the clamshell portion is open. The mechanism comprises a number of tines which project through spaces between adjacent belt runs of a belt which lies across the bottom of the baler leading from the feed inlet to the clamshell opening. The tines are actuated by a lever mechanism which is spring biased into a raised position of the tines and includes a sliderod which is moved by opening and closing of the clamshell housing.

9 Claims, 3 Drawing Figures

BALING MACHINE

BACKGROUND OF THE INVENTION

This invention relates to a baling machine and particularly one of the type comprising a cylindrical chamber or housing into which harvested material is fed and is rolled by belts within the housing into a large cylindrical bale.

Baling machines of this type have become very popular for various reasons in recent years and are widely used for baling harvested material from swaths. The operation is now well developed and the baling technique is very effective however a problem remains in relationship to the unloading of formed bales and the material which is fed during the unloading process.

The instruction manual for most baling machines of this type requires that prior to ejection of a formed bale, the baler be halted in its movement across the ground and the tractor reversed so as to back up the baler by about ten (10) feet. At this stage the housing is opened by pivotal movement of a rear section of the housing about a horizontal axis at the top of the housing so as to open at an opening provided at the bottom rear portion of the housing to allow the bale to escape. The front and rear portions thus operate somewhat in the form of a clamshell arrangement with the bale being ejected from the opened housing by the belts which form the bale within the housing.

With the bale ejected from the housing, the tractor can move forward so that the rear portion clears the bale and then can close the housing to restart formation of the next bale. During the forward movement, because of the previous backup, no material is fed into the baler for those ten (10) feet so that by the time the baler encounters fresh material for collection it is closed and ready to continue operation.

This operation is however unsatisfactory in that the operator has to stop and maneouver the tractor and baler which is undesirable and therefore the operator attempts to avoid it. This can cause a number of problems including contacting the bale with the rear portion as it closes, feeding material right through the front portion of the baler and out the opening which can waste material and furthermore material can be trapped between the two portions of the housing as they close and thus can inhibit the proper formation of a bale within the housing and can cause jamming of the feed mechanism into the housing.

Proposals have been made in U.S. Pat. No. 3,914,922 (Todd) and in U.S. Pat. No. 4,135,352 (Swenson) both of which propose spring-mounted tines which are normally biased into position which inhibits movement of material from the feed mechanism into the housing. The spring tines are then depressed by the formation of the bale to a position where the formation can continue.

Both of these arrangements are concerned with the type of baler including an elongate inner belt run which extends substantially wholly around the interior surface of the housing and expands as the bale increases in size. Following ejection of the bale the elongate band is drawn inwardly relative to the inner surface of the chamber or housing. In addition both of the above devices are unsatisfactory in that they can interfere with the proper formation of the bale particularly in the type of device wherein the belts lie around the periphery of the housing and are formed by a number of separate belt runs as opposed to the continuous belt run which collapse into the interior of the housing when the bale is ejected.

It is one object of the present invention, therefore, to provide an improved bailing device which overcomes the disadvantages of the above arrangements.

According to the invention, therefore, there is provided a baling machine comprising a substantially cylindrical housing, means at a bottom front position of the housing for feeding crop material fromm a swath into the housing, the housing including a front portion and a rear portion, means mounting the rear portion on the front portion for pivotal movement about a horizontal axis arranged adjacent to the top of the housing so as to open at an opening at a bottom rear position of the housing to allow a formed bale to escape from the housing, belt means within the housing for forming the fed material into a bale, a plurality of tines movable from a retracted position in which they lie outside the belt means and do not interfere with the formation of the bale to a raised position in which they project inwardly of the belt means to engage material fed by said feeding means and means operatively associated with movement of said rear portion of the housing to and from an open position for moving said tines to and from the raised and retracted positions respectively.

According to a second aspect of the invention there is provided a baling machine comprising a substantially cylindrical housing, a plurality of belt run portions arranged around an inner periphery of the housing in spaced relation to one another angularly of the housing defining a chamber, means at a bottom front position of the housing for feeding crop material from a swath into the chamber for rolling by the belt portions into a bale, the housing including a front portion and a rear portion, means mounting the rear portion on the front portion for pivotal movement about a horizontal axis arranged adjacent the top of the housing so as to open at an opening at a bottom rear position of the housing to allow a formed bale to escape from the chamber, one of the belt run portions including a plurality of separate belts spaced axially of the housing each having an inner run extending from said feeding means to said opening, a plurality of tines movable from a retracted position in which they wholly underlie the inner run of the belts to a raised position in which they project between the inner runs inwardly into the housing and means operatively associated with movement of said rear portion of the housing to and from an open position for moving said tines to and from the raised and retracted positions respectively whereby when the rear portion of the housing is opened the tines are moved to the raised position to halt the movement of material on said one belt run portion to said opening.

The tines can therefore can be operated by opening and closing of the clamshell front and rear portions so that when the rear portion is closed the tines are immediately retracted to a position underlying the lower belt so that they cannot interfere with the formation of the next bale.

This is particularly important in relation to the type of bailer using separate belt portions which remain around the periphery of the housing rather than collapsing to the interior of the housing since the projection of tines into the interior can interfere with the proper rolling of the material around the interior. Thus even if the tines can be compressed by the formation of the bale their presence during the initial portions of the bale formation can interfere with the proper formation of the bale.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
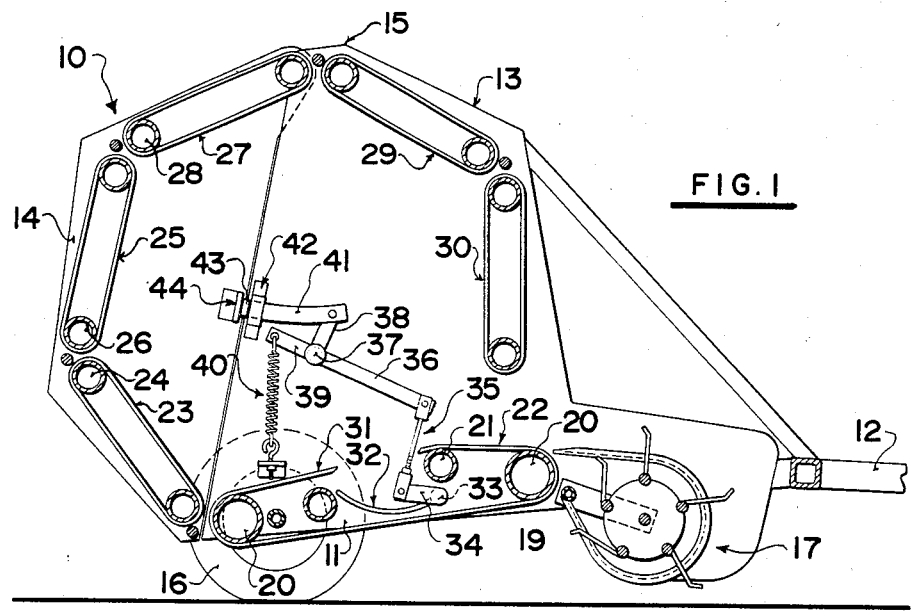
FIG. 1 is a schematic side elevational view partly in cross-section of a baling machine according to the invention.

Referring firstly to FIG. 1 there is shown a baling machine of a conventional type which includes a housing 10 mounted on groundwheels 11 and drawn by a hitch 12 from a tractor (not shown).

Figure 2:
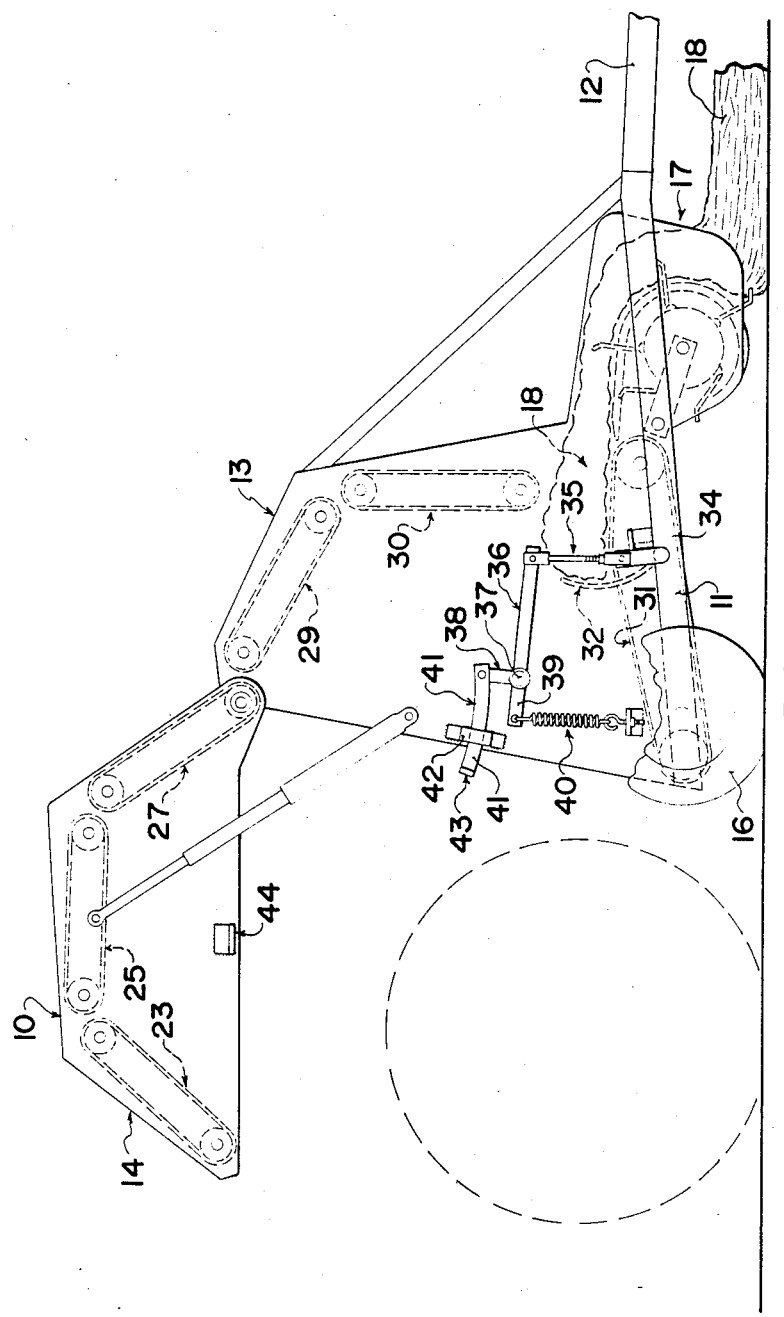
FIG. 2 is a side elevational view of the actuating mechanism of FIG. 1 shown with the tines in raised position and omitting for simplicity of illustration the baling machine itself.

The housing is formed in two portions comprising a front portion 13 and a rear portion 14 which are relatively hinged at a horizontal axis 15 so that they can open at an opening point 16 to assume the position illustrated in FIG. 2 in which the chamber is opened to allow the exit of a formed bale.

A feed mechanism indicated schematically at 17 is provided at a front lower portion of the housing 10 for collecting harvested material in a swath 18.

Within the housing a bale is formed by a plurality of belts which are arranged around the periphery of the cylindrical housing 10. A first belt indicated at 19 is formed at the bottom of the housing extending from the inlet of the feed section 17 to the opening 16 for initially conveying the fed material across the bottom of the housing. The belt 19 is mounted on dry rollers 20 and a tensioning roller 21 extending parallel to the axis of the cylindrical housing 10 with one or more of the rollers 20 driven in a direction to move the upper or inner run of the belt 19 indicated at 22 in a rearward direction toward the opening 16.

Rearwardly of the roller 20 at the opening 16 is provided a further belt 23 mounted on rollers 24 and carried by the rear portion 14 of the housing. This belt also provides an inner run which carries the material from the rear end of the belt 22 rearwardly and upwardly in the housing toward a further belt 25 mounted on rollers 26 and from there to a yet further belt 27 mounted on rollers 28. From the end of the belt 27 extends first belt 29 and a second belt 30 in the front portion 13 of the housing the latter extend downwardly to the front of the belt 22. Thus the inner runs of each of the belts combine to form a rotating supporting surface for the material around the inner periphery of the housing 10 with each of the belt forming a portion of the periphery spaced angularly of the housing. It would be appreciated that the pivot axis 15 and the opening 16 are provided between adjacent ends of respective belts so that the opening causes movement of the belt 23 away from the belt 22 to allow the escape of a formed bale.

Figure 3:
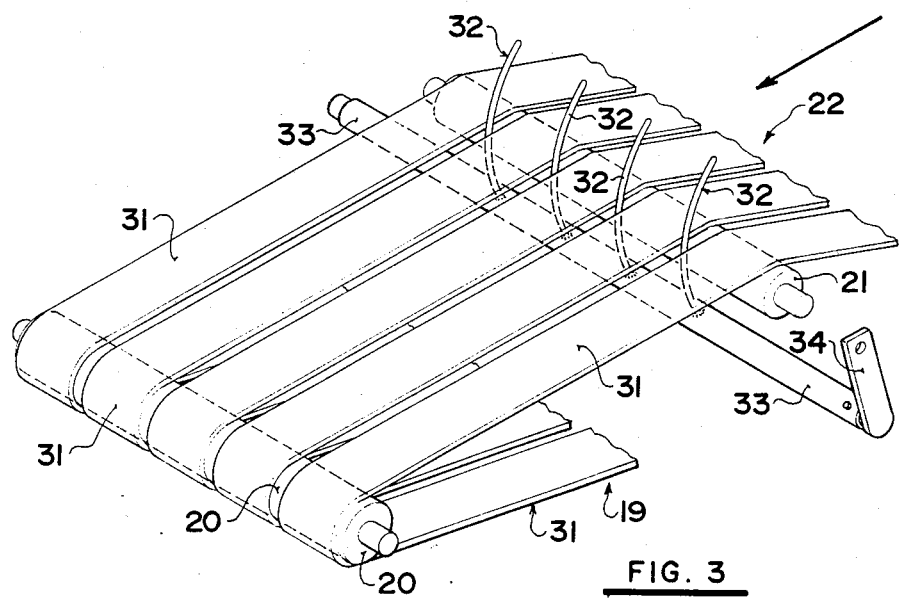
FIG. 3 is an isometric view showing the tines and part of the adjacent belt run with the tines in raised position for engaging the harvested material.

As illustrated in FIG. 3, each of the belts 22, 23, 25, 27, 29, 30 is formed of a plurality of separate bands 31 which are spaced axially of the housing and which co-operate to effectively form an apron or belt extending the full width of the chamber. The rollers 20, 24, 26, 28 are fixed to the respective housing portion and hence retain the belts at the other periphery of the housing regardless of the amount of material within the housing.

As shown in FIG. 3 a plurality of tines 30 are provided each of which passes through a respective slot between two of the bands 31. The tines 30 are arcately curved so as to present a concave side to the upstream side of the belt run 22 in the raised position illustrated in FIGS. 2 and 3. The tines are mounted upon an elongate actuating rod 33 which extends across the bands 31 to one side for connection to a lever 34 which is positioned outside the housing on one sidewall. The lever 34 is connected to a push-rod 35 which extends downwardly along the outer surface of the sidewall which in turn is pivotally connected to a bell-crank 36 including a first leg at 37 and a second leg at 38 at right angles to the first. The bell-crank is also connected by an extension portion 39 to a spring 40 which provides spring-bias in a direction to lift the tines 32 into the raised position illustrated in FIGS. 2 and 3. The end of the portion 38 of the bell-crank 36 is attached to a curved slide rod 41 which passes through a guide 42 attached to the front portion of the housing on an outer surface of the end face thereof. The slide rod 41 includes an end abutment face 43 for engaging a fixed stop 44 attached to the outer face of the rear portion 14 of the housing.

In operation with the rear portion 14 of the housing closed, the stop 44 engages the slide rod 41 which in turn rotates the connecting rod 33 via the bell-crank 36 in an anti-clockwise direction as shown in FIG. 1 to retract the tines 32 to a position where they are fully underlying the upper run 22 of the belt 19. In this position the tines 32 in no way interfere with the rolling or tumbling of the collected harvested material and thus allow it to be rotated by the belts to roll into a bale which is of the generally cylindrical shape defined by the belts themselves.

When the formation of the bale is complete, the operator can open the rear portion 14 of the housing to allow the release of the bale. At this point the stop 44 is moved away from the abutment face 43 of the slide rod 41 so that the spring 40 tends to turn the bell-crank 36 in an anti-clockwise direction to rotate the connecting rod 33 in a clockwise direction to raise the tines 32 to the position shown in FIGS. 2 and 3. This raising movement assists in ejecting the bale from the chamber in view of the positioning of the tines forwardly of the center of gravity of the bale and thus the bale rolls rearwardly from the belt 22 onto the ground. This ejection movement can be carried out with the baler stationary after halting the movement of the tractor. As the baler then moves forwardly to recommence collecting the swath 18 and to clear the rear portion 14 from the ejected bale, further material from the swath 18 is drawn in by the feed mechanism generally indicated at 17 and onto the belt run 22. The material then engages the concave side of the tines 32 and therefore is trapped between the upper run of the belts 22 and the concave side of the tines 32 with the material being held sufficient period of time to allow the rear portion 14 to be closed. As soon as the rear portion 14 closes, the tines 32 are as previously described moved into the retracted position shown in FIG. 1 to allow proper movement of the harvested material around the chamber under control of the belts.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A baling machine comprising a substantially cylindrical housing, means at a bottom front position of the housing for feeding crop material into the housing, the housing including a front portion and a rear portion, means mounting the rear portion on the front portion for pivotal movement about a horizontal axis arranged adjacent to the top of the housing so as to open at an opening at a bottom rear position of the housing to allow a formed bale to escape from the housing, belt means within the housing defining a chamber for forming the fed material into a bale, means for halting feeding of said material into said chamber, said halting means consisting solely of a plurality of tines movable from a retracted position in which they lie outside the belt means and do not interfere with the formation of the bale to a raised position in which they project inwardly of the belt means, said tines being shaped to engage and halt material fed by said feeding means, said tines being fixedly mounted on a common pivotal member for common pivotal movement therewith and mechanical interconnecting means directly communicating movement of said rear portion of the housing to and from an open position to said common pivotal member to move said tines to and from the raised and retracted positions respectively.

2. A baling machine according to claim 1 wherein the mechanical interconnecting means is spring biased to a raised position of the tines and wherein said rear portion includes a stop device for holding said mechanical interconnecting means against said spring biased in said retracted position while the rear portion is in a closed position.

3. A baling machine according to claim 2 wherein the mechanical interconnecting means includes a curved push-rod extending through a guide and carrying an abutment member on one end for engaging the stop device on the rear portion, the other end of the push-rod engaging a bell crank for moving said tines.

4. A baling machine according to claim 1 wherein the tines are curved so as to present a concave side thereof to said material from said feeding means.

5. A baling machine according to claim 1 wherein the tines are positioned forwardly of the center of gravity of said formed bale whereby when the rear portion is opened the tines are moved to the raised position so as to assist in the ejection of the bale.

6. A baling machine comprising a substantially cylindrical housing, a plurality of belt run portions arranged around an inner periphery of the housing in spaced relation to one another angularly of the housing defining a chamber, means at a bottom front position of the housing for feeding crop material into the chamber for rolling by the belt portions into a bale, the housing including a front portion and a rear portion, means mounting the rear portion on the front portion for pivotal movement about a horizontal axis arranged adjacent the top of the housing so as to open at an opening at a bottom rear position of the housing to allow a formed bale to escape from the chamber, one of the belt run portions including a plurality of separate belts placed axially of the housing each having an inner run extending from said feeding means to said opening, means for halting feeding of said material into said chamber, said halting means consisting solely of means for halting feeding of said material into said chamber, said halting means consisting solely of a plurality of tines movable from a retracted position in which they wholly underlie the inner run of the belts to a raised position in which they project between the inner runs inwardly into the housing, said tines being shaped so as to engage and halt movement of material on said one belt run portion to said opening and being fixedly mounted on a common pivotal member for movement therewith and mechanical interconnecting means for directly communicating movement of said rear portion of the to and from an open position for moving said common pivotal member to move said tines to and from the raised and retracted positions respectively whereby when the rear portion of the housing is opened the tines are moved to the rear position to halt the movement of material on said one belt run portion to said opening, said mechanical interconnecting means being spring biassed to the raised position of the tines and the rear portion including a stop mechanism for holding said mechanical interconnecting means in the retracted position of the tines while the rear portion is in a closed position.

7. A baling machine according to claim 6 wherein the mechanical interconnecting means includes a curved push-rod extending through a guide and carrying an abutment member on one end for engaging the stop device on the rear portion, the other end of the push-rod engaging a bell crank for moving said tines.

8. A baling machine according to claim 6 wherein the tines are curved so as to present a concave side thereof to said material from said feeding means.

9. A baling machine according to claim 6 wherein the tines are positioned forwardly of the center of gravity of said formed bale whereby when the rear portion is opened the tines are moved to the raised position so as to assist in the ejection of the bale.

* * * * *